US010761585B2

(12) United States Patent
Diefenbaugh et al.

(10) Patent No.: US 10,761,585 B2
(45) Date of Patent: Sep. 1, 2020

(54) TECHNIQUES AND SYSTEM FOR MANAGING ACTIVITY IN MULTICOMPONENT PLATFORM

(71) Applicant: INTEL CORPORATION, Santa Clara, CA (US)

(72) Inventors: Paul S. Diefenbaugh, Portland, OR (US); Eugene Gorbatov, Portland, OR (US); Andrew Henroid, Portland, OR (US); Eric C. Samson, Folsom, CA (US); Barnes Cooper, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 13 days.

(21) Appl. No.: 16/158,190

(22) Filed: Oct. 11, 2018

(65) Prior Publication Data

US 2019/0107879 A1   Apr. 11, 2019

Related U.S. Application Data

(63) Continuation of application No. 15/263,274, filed on Sep. 12, 2016, now Pat. No. 10,114,441, which is a continuation of application No. 14/129,950, filed as application No. PCT/US2013/048778 on Jun. 28, 2013, now Pat. No. 9,442,558.

(51) Int. Cl.
*G06F 1/32* (2019.01)
*G06F 1/3234* (2019.01)
*G06F 1/3287* (2019.01)
*G06F 1/3246* (2019.01)
*G06F 9/48* (2006.01)

(52) U.S. Cl.
CPC ......... *G06F 1/3234* (2013.01); *G06F 1/3246* (2013.01); *G06F 1/3287* (2013.01); *G06F 9/4893* (2013.01); *Y02D 10/24* (2018.01); *Y02D 50/20* (2018.01)

(58) Field of Classification Search
CPC ..... G06F 1/3234; G06F 1/3287; G06F 1/3246
See application file for complete search history.

(56) References Cited

U.S. PATENT DOCUMENTS

| | | | |
|---|---|---|---|
| 2013/0007413 A1* | 1/2013 | Thomson | G06F 1/324 712/30 |
| 2019/0265774 A1* | 8/2019 | Tsien | G06F 1/3287 |
| 2020/0073461 A1* | 3/2020 | Sadowski | G06F 1/329 |

\* cited by examiner

*Primary Examiner* — Stefan Stoynov

(57) ABSTRACT

In one embodiment an apparatus includes a multiplicity of processor components; one or more device components communicatively coupled to one or more processor components of the multiplicity of processor components; and a controller comprising logic at least a portion of which is in hardware, the logic to schedule one or more forced idle periods interspersed with one or more active periods, a forced idle period spanning a duration during which the multiplicity of processor components and the one or more device components are simultaneously placed in respective idle states that define a forced idle power state during isolated sub-periods of the forced idle period. Other embodiments are disclosed and claimed.

20 Claims, 11 Drawing Sheets

TECHNIQUES AND SYSTEM FOR MANAGING ACTIVITY IN MULTICOMPONENT PLATFORM

CROSS-REFERENCE TO RELATED APPLICATIONS

This application is a continuation of, claims the benefit of and priority to previously filed U.S. patent application Ser. No. 15/263,274 filed Sep. 12, 2016, which claims the benefit of and priority to previously filed U.S. patent application Ser. No. 14/129,950 filed Dec. 28, 2013, which is a national stage application claiming the benefit of and priority to International Patent Application No. PCT/US2013/048778 entitled "TECHNIQUES AND SYSTEM FOR MANAGING ACTIVITY IN MULTICOMPONENT PLATFORM" filed Jun. 28, 2013, which are hereby incorporated by reference in their respective entireties.

TECHNICAL FIELD

Embodiments described herein generally relate to power management in integrated circuit devices and in particular controlling device activity among multiple different processor components and/or devices.

BACKGROUND

In present day computing and communications device platforms many different device components are often arranged on a printed circuit board, package or even a single semiconductor die, the latter often referred to as a system on a chip (SoC). Device components that may be present on an SoC chip include, for example, general purpose processor cores, graphics processing units, memory controller, display engine, cache, to name a few components. Other components such as power management units may be arranged on an SoC chip or in another die. A problem with efficient operation of some SoC architecture arises from managing activity across each subsystem to achieve optimally efficient performance. Anytime peripheral regions become active and generate events such as direct memory access, interrupts, or other signals, other components including processor cores, graphics processor units, may be forced to reside in a relatively high power state that consumes excess power, even though processor core functions may not be required. This may become an impairment to efficient operation under many type or workloads and in particular under semi-active workloads.

Accordingly, there may be a need for improved techniques and apparatus to solve these and other problems.

DETAILED DESCRIPTION

Various embodiments are directed to coordinating activity in multicomponent platforms. A multicomponent platform may form part of a computing device, communications device, hybrid communications/computing device, a controller device, or other hardware. The multicomponent platforms of the present embodiments include multiple electronic processing components such as graphics processor units (GPU) and general purpose processors, which may be referred to herein as "CPU." A general purpose processor may include one or more processor cores, or "CPU cores." The multicomponent platforms include various additional components, which may include, among others, cache local to the CPU, memory, system clocks, input/output (I/O) devices, display engines, memory controllers, I/O controller, digital signal processors, disk drives, radio frequency communications circuitry, digital camera devices or other sensor devices, communications interfaces including antennae, universal serial bus (USB) interfaces, and power control units (power management units). The embodiments are not limited in this context.

Consistent with the present embodiments, methods and apparatus are provided to perform component duty cycling to coordinate the activity among multiple different components of a platform. The term "duty cycling" as used herein, generally refers to the forced or scheduled alignment of a succession of idle periods among multiple components of a platform. The duty cycling may further entail forced alignment of active periods among multiple platform components. Duty cycling accordingly entails cycling between forced idle periods and active periods. In particular, the present embodiments are effective to define forced idle periods during which multiple platform components are simultaneously placed in idle or low power states that define a forced idle state. In various embodiments, as detailed below, in order to accommodate different requirements of different components of a multi-component system, hybrid or nested duty cycling is performed in which smaller periods (which may be alternatively referred to herein as "subperiods") are scheduled within a forced idle period.

Figure 1:
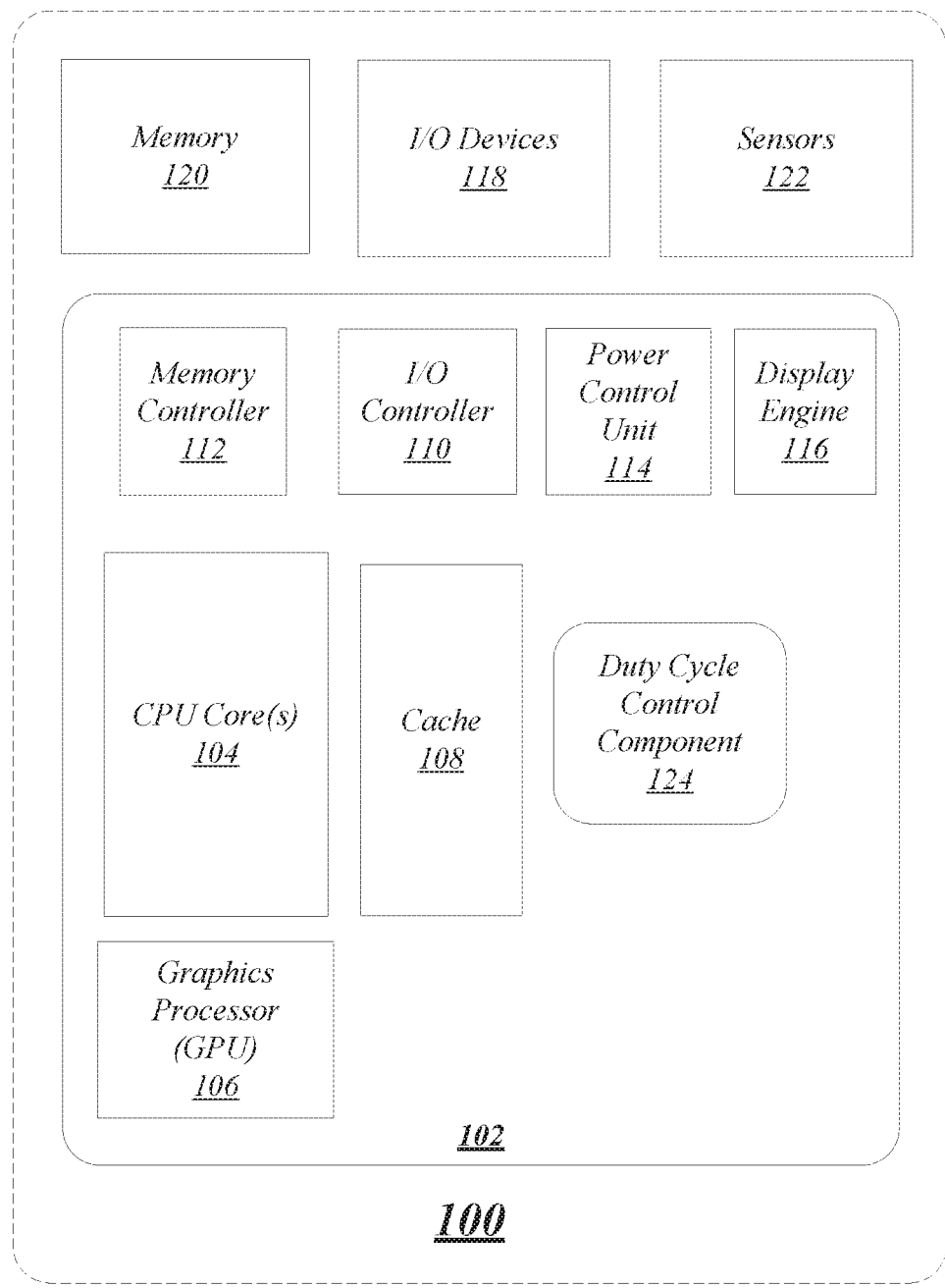
FIG. 1 illustrates a block diagram for an exemplary system.

FIG. 1 illustrates a block diagram for a platform or system 100 consistent with the present embodiments. The system 100 is generally directed to at least performing general computing and graphics processing functions. However, in various embodiments a system such as system 100 may include conventional components additional to those shown in FIG. 1, and may perform additional functions such as conducting wireless communications, performing electronic imaging, and other functions.

As illustrated, the system 100 includes a set of components 102. In some embodiments the set of components 102 may be located on a single semiconductor die (chip), forming a so-called System-on-a-chip. However, in other embodiments, the individual components of the set of components 102 may be dispersed among multiple different chips or may be dispersed across different physical systems and connected through a wired or wireless network or other communications medium. In the particular embodiment of FIG. 1, the system 100 includes CPU core(s) 104, graphics processor unit (GPU) 106, cache 108, I/O controller 110, memory controller 112, power control unit 114, display engine 116, I/O devices 118, memory 120, and sensors 122 In various embodiments the CPU core(s) 104 may include one or more CPU cores.

The system 100 may provide a more efficient and effective power management scheme to coordinate activity among the various components of system 100 without unduly sacrificing desired performance. In particular, the system 100 includes a duty cycle control component to facilitate maintenance of low platform power consumption by aligning idle periods of various components of the system 100 including the CPU core(s) 104, GPU 106, and other components of system 100. This helps avoid problems associated with conventional platform operation in which even small levels of activity in platform components that don't require CPU or GPU processing power may engender excessive power consumption by such devices. By aligning idle periods of CPU core(s) 104, GPU 106, and other components, overall platform power consumption may be reduced without impacting the performance capacity of the system 100 when fully active.

Consistent with the present embodiments, and detailed with respect to the FIGs. to follow, the duty cycle control component 124, by forcibly aligning or scheduling activity across multiple components of the system 100, defines one or more new lightweight power states for the platform 100. This produces a wider dynamic range of power levels that are accessible for the system 100 in comparison to conventional component-level power states that are defined in present day computing platforms."

The duty cycle control component 124 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

In particular embodiments, the duty cycle control component 124 includes logic at least a portion of which is in hardware and is included in a controller or processor. For example the logic may be included in a processor circuit linked to other components of system 100. In one particular example the logic forms part of a processor such as a CPU core(s) 104 and is communicatively linked to the other components of system 100. In other embodiments, the logic of the duty cycle control component 124 may be located in a controller such as the power control unit 114. In further embodiments, the duty cycle control component may be distributed across multiple platform components including cache and/or memory components. In operation, the duty cycle control component 124 may invoke duty cycling when appropriate for operation of the system 100. In some embodiments, duty cycling may be established as a default mode of operation for system 100. In particular embodiments, the duty cycle control component 124 may execute forced idle states on different components of the system 100 either independently or in unison, and may perform duty cycling in a manner that cycles portions of a system component separately from others. In addition, the duty cycle control component 124 may generate multiple different levels of duty cycling to accommodate requirements for different components of system 100.

In particular embodiments, as noted above, the duty cycle control component 124 initiates nested or hybrid duty cycling in which the number of components whose activity is aligned varies between different periods. This is particularly useful to address situations in which simultaneous alignment of activity among all components or among certain components of the system 100 may not be possible or desirable. For example the forced alignment of idle periods of CPU core(s) 104, GPU 106, and I/O devices 118 may be compromised by the limited idle duration for given I/O devices, given, for example, limited buffering capability.

Figure 2:
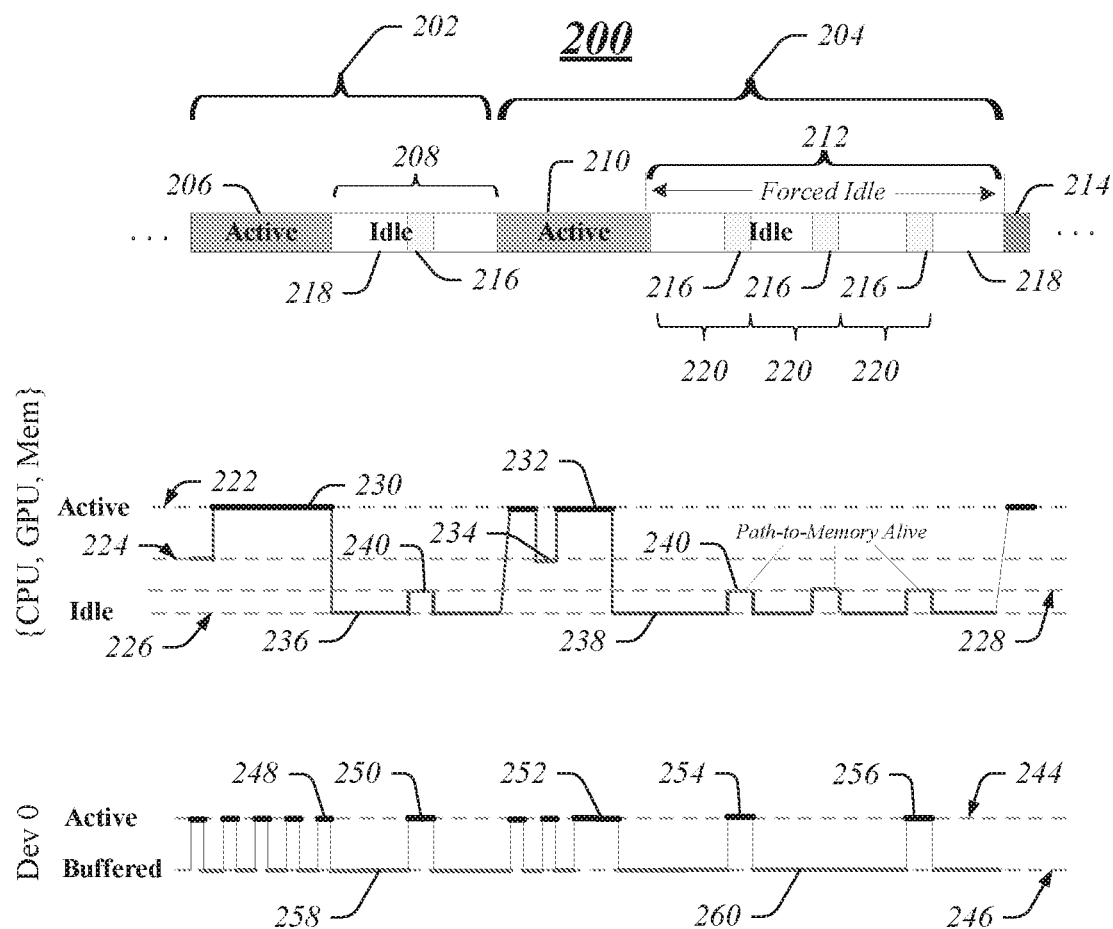
FIG. 2 illustrates operation of a first embodiment of duty cycling.

FIG. 2 depicts details of one example of duty cycling consistent with the present embodiments. In FIG. 2 there is shown a duty cycle arrangement 200 that includes a series of active periods that are interspersed with idle periods. A single global cycling interval or global duty cycle may be defined by an active period followed by and adjacent idle period such as global duty cycles 202, 204. In the present embodiments, the active periods 206, 210, 214 may have a same or similar duration, or the duration may vary among active periods. During an active period, processor cores 104, GPU 106, and other components of a system 100 may be operated in relatively higher states. For example, a set of P (or PC) states may correspond to power-performance states that includes a highest performance state (P0, or PC0). During idle periods, which are referred to herein as forced idle periods 208, 212, etc., multiple targeted system components including the processor core(s) 104, GPU 106, and other targeted system components are aligned so that each targeted system component is placed in an idle state simultaneously with other targeted system components for at least a portion of the forced idle period. In the example of FIG. 2, the forced idle period 208 differs in length from the forced idle period 212, though in other embodiments forced idle periods may have a same or similar duration.

As further illustrated in FIG. 2, each forced idle period is composed of idle sub-periods 218 interspersed with one or more shallow active sub-periods 216. The idle sub-periods 218 may correspond to so-called idle states in which one or more processor cores 104 may be operated in low power states, such as C-states (or PC states), which may reflect lower processor clock frequency, lower voltage, and so forth, as compared to a PC0 state. For example, a family of core C-states may represent a hardware state, and may include several different core idle states that may be applied to a set of cores. At the same time, a GPU 106 may be operated at a lower power state or idle state, which may be represented by an RC state, such as RC6. Finally, other platform components such as controllers, I/O devices may be placed in an idle state during the idle sub-period 218. Together, on a platform-wide basis the alignment of idle states for CPU core(s) 104, GPU 106, and other platform components, defines a forced idle state. In embodiments in which all the components whose idle periods are arranged within the idle sub-periods 218 are located on a common (single) semiconductor die, the forced idle state may represent a so-called SoC idle state.

As further shown in FIG. 2, a shallow active sub-period 216 and adjacent idle sub-period 218 define a nested duty cycle 220 that takes place one or more times with each forced idle period 208, 212, etc. A function of the nested duty cycle 220 is to allocate shallow active slots or sub-periods during which the power state of system components is adjusted upwardly (to a higher power state) to accommodate cycling into active state for one or more components of the system 100 that may not function properly if maintained in an idle state for the duration of a forced idle period. FIG. 2 also depicts the state or activity level for processor components of the system 100, which may represent activity level of individual components such as CPU core(s) 104, GPU 106, or may be a composite of activity levels among multiple components including CPU core(s) 104, GPU 106, memory components, and so forth. As shown, during each active period, the activity level may vary between an active state 222 (see portions 230, 232) and intermediate state 220 (see portion 234). This variation may take place according to conventional procedures and in response to current processing conditions.

During each forced idle period 208, 212, the CPU core(s) 104, GPU core 106, and other components are placed in forced idle state such that the activity level reduces to a forced idle state 226 for portions (see portions 236, 238) of each forced idle period. For example the portion 236 corresponds to the idle sub-period 218. In addition, during the shallow active sub-periods 216, the activity rises to the shallow active state 228 (see portions 240). As shown in FIG. 2, during these shallow active periods, a path to memory may be kept alive for one or more system components. In this manner, the proper function of certain system components is facilitated during a given shallow active sub-period 216. This is also highlighted in FIG. 2 which further depicts activity of a system component, labeled dev0. In one example the dev0 represents an I/O component having a buffer that is limited in size such that refreshing needs to take place at intervals that are smaller than the duration of the forced idle periods 208, 212. As shown, the dev0 component alternates between active state 244 and buffered state 246.

During an active period 206, 210, etc. the activity state of dev0 may be characterized by multiple active portions, such as portions 248, 252, which may be scheduled according to conventional procedures. During an active state, data may be transferred, for example, to a memory such as cache or system memory. The scheduling of active states for dev0 during the active periods 206, 210 may take place according to current processing demands.

During the forced idle periods 208, 212, the duty cycle control component 124 schedules activity of dev0 such that the dev0 is in an active state only during the shallow active sub-periods 216, which may be spaced at regular intervals. Consistent with the embodiment of FIG. 2, the spacing of the shallow active sub-periods 216 is arranged such that the duration of an active sub-period 218 does not exceed a threshold time related to operation of the component dev0. The threshold time may be based, for example on a buffer capacity of dev0. In particular, the threshold time may be a calculated or estimated maximum time to safely operate the dev0 without having to perform a direct memory access or similar operation to transfer data from the buffer of the dev0 to avoid data loss. Accordingly, as shown in FIG. 2, activity levels of dev0 increase to the active level 244 as exemplified by active portions 250, 254, 256, which each take place during a forced idle period. Notably, the shallow active sub periods 216 accommodate the need to place the dev0 component in an active state at different instances spaced by shorter intervals than that provided by adjacent active periods 210, 214.

Once a shallow active sub-period is completed, activity in the dev0 cycles down to a buffered state and subsequent activity such as additional DMAs may be deferred to a next shallow active sub-period. Accordingly, by providing nested duty cycling, during the forced idle periods, the overall activity level of the bulk of a platform, such as CPU core, GPU, and other components is maintained in a deeply power managed state by allowing CPU core and GPU activity to be maintained at low activity levels, such as the forced idle level 226 and shallow active state 228. At the same time, a "light" shallow active state may be cycled at multiple instances within a forced idle period to generate a path-to-memory with the necessary frequency to service those components with limited buffering capability. More generally, the nested duty cycle allows devices such as Dev 0 to periodically perform any needed activity in a timely fashion such as DMA operations, which does not implicate CPU processor core activity or other processor activity, without cycling CPU core(s) 104 and/or GPU 106 into unnecessarily high power states. In particular examples, a forced idle period may span up to one millisecond or more and a nested duty cycle between adjacent shallow active sub-periods may be about 100 µs.

Figure 3:
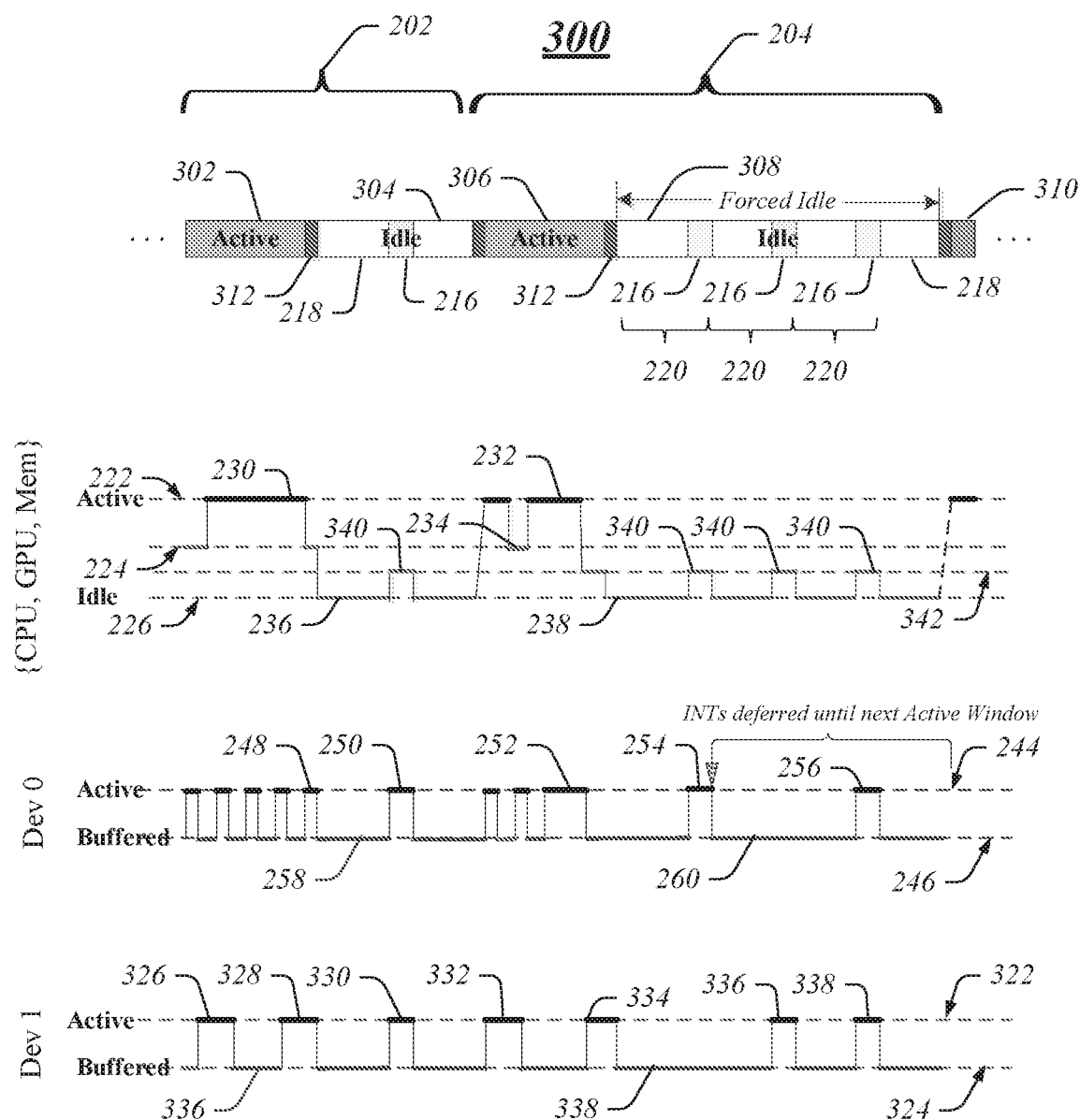
FIG. 3 illustrates operation of a second embodiment of duty cycling.

FIG. 3 depicts details of a second example of duty cycling consistent with the present embodiments. The scenario depicted in the arrangement 300 of FIG. 3 may be considered a variant of that depicted in FIG. 2 and like elements retain the same reference numbers and/or labels among both figures. In particular, the scenario of FIG. 3 differs from that of FIG. 2 in one respect in that the activity of a second component dev1 is additionally depicted, which alternates between the active level 322 and 324. In addition, the active periods 302, 306,310 are separated from interspersed forced idle periods 304, 308, by transition intervals 312.

As illustrated, the dev1 component exhibits active portions 326, 328, 330, 332, 334, 336 and 338 which take place both during active periods 302, 306 and forced idle periods 304, 308. In particular, the active portions 330, 336, and 338 each take place during a shallow active period 216. As further illustrated in FIG. 3, the composite activity state for processors during shallow active periods 216 is defined by portions 340, whose power is defined by shallow active state 342. Is some instances the power level may be higher for shallow active state 342 than that of shallow active state 228 of portions 240, due to the need to accommodate multiple active devices within a shallow active period. For example, the (active) portions 256 and 338 for respective components dev0 and dev1 overlap within a single shallow active period 216.

As suggested by FIG. 3, the present embodiments facilitate the alignment of activity of different components of a platform using nested duty cycling such that occasional activity performed by platform components other than processor components can be accommodated without compromising the platform component operation and without unnecessarily reviving processor components during forced idle periods. In the present embodiments, in addition to scheduling DMA activity only during shallow active periods, other processes or signaling may be similarly restricted.

For example, hardware or software-generated interrupts may be processed in a given shallow active period within a forced idle period, after which further interrupts may be delayed for processing, for example, until a next active period.

In further embodiments, multiple nesting levels for duty cycling are provided within a given forced idle period. This may be advantageous in circumstances where different platform components need to be serviced at different frequencies for proper operation. For example, limited buffers in a platform camera sensor may need to be serviced frequently (e.g. 50 µs). In one scenario, data that streams into a camera sensor buffer may be pulled into larger shared SRAM resident in the platform, at an "inner-level" duty cycle that spans 50 µs. The camera sensor data accumulated in SRAM may then be flushed to main memory at a "midlevel" duty cycle corresponding to every fifth cycle of the "inner level" duty cycle, or every 250p. The camera data stored in main memory may then be serviced by a component such as an image signal processor (ISP) accelerator every 1 ms, representing the highest-duty cycling level of 1 ms.

Figure 4:
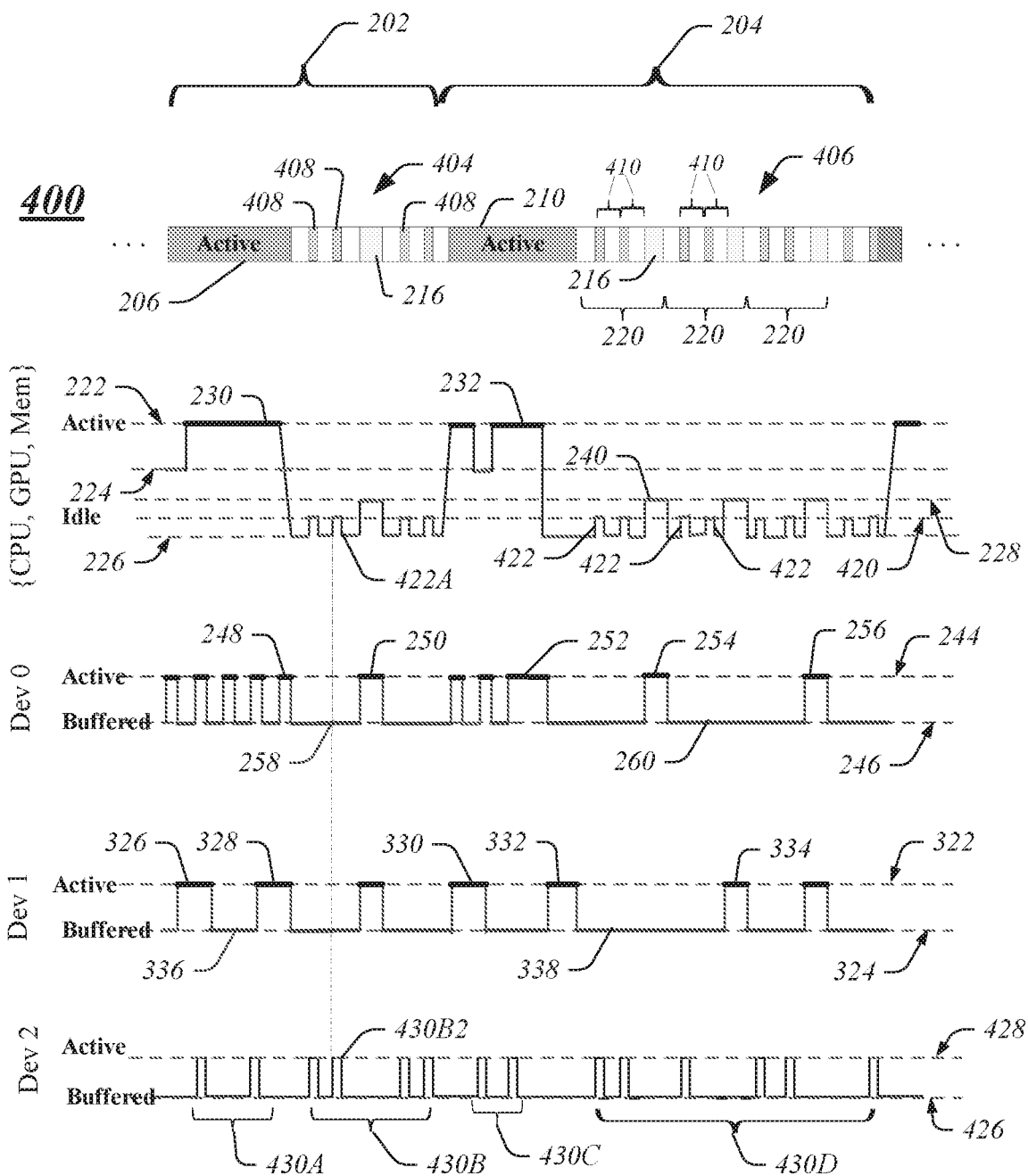
FIG. 4 illustrates operation of a third embodiment of duty cycling.

FIG. 4 depicts details of a third example of duty cycling consistent with the present embodiments in which multiple duty cycling nesting levels are accommodated within forced idle periods. In this example, active periods 206, 210 alternate with forced idle periods 404, 406. In addition to the aforementioned components dev0 and dev1, in this example, the multiple nesting arrangement 400 accommodates the activity of a third component dev2, which is characterized by a different duty cycle in which activity cycles between active state 428 and buffered state 426. As shown, the multiple nesting arrangement 400 includes within each forced idle period shallow active sub-periods 408 in addition to the shallow active sub-periods 216. The shallow active sub-periods 408 occur at a greater frequency than the shallow active sub-periods 216 and are defined by a different activity level for a shallow active state 420 as shown. In this case, during each shallow active sub-period 408, a portion 422 of the platform activity is defined by the activity level for a shallow active state 420 for a relatively shorter duration, which may correspond to the time and power necessary to facilitate operations such as camera sensor data transfer to memory. In turn, each active portion 430A-430-D of the dev2 device takes place either in an active period 206 (430A), 210 (430C), or within a forced idle period 404 (430B), 406 (430D). As with the previous scenarios depicted in FIGS. 2 and 3, the duty cycling that defines the activity levels for shallow active states 228, 420 and the duration of respective shallow active sub-periods 216, 408 needed to accommodate the operation of components dev0, dev1, dev2, may allow the overall or average power for forced idle periods 404, 406, etc., to be minimized while the necessary component functions are performed.

In additional embodiments, the duty cycle control component may coordinate with a software component such as a graphics driver to align activity of different platform components. In particular, the duty cycle control component may coordinate with a graphics driver that schedules a GPU to transition between active state periods and idle or deeply power managed state periods. In these embodiments the duty cycle control component may coordinate the sharing of policy hints and other information between hardware and software components such as between a power control unit and graphics driver. Exemplary scenarios include coordinating operating system driven CPU core duty cycling with driver based GPU and hardware driven I/O duty cycling.

Figure 5A:
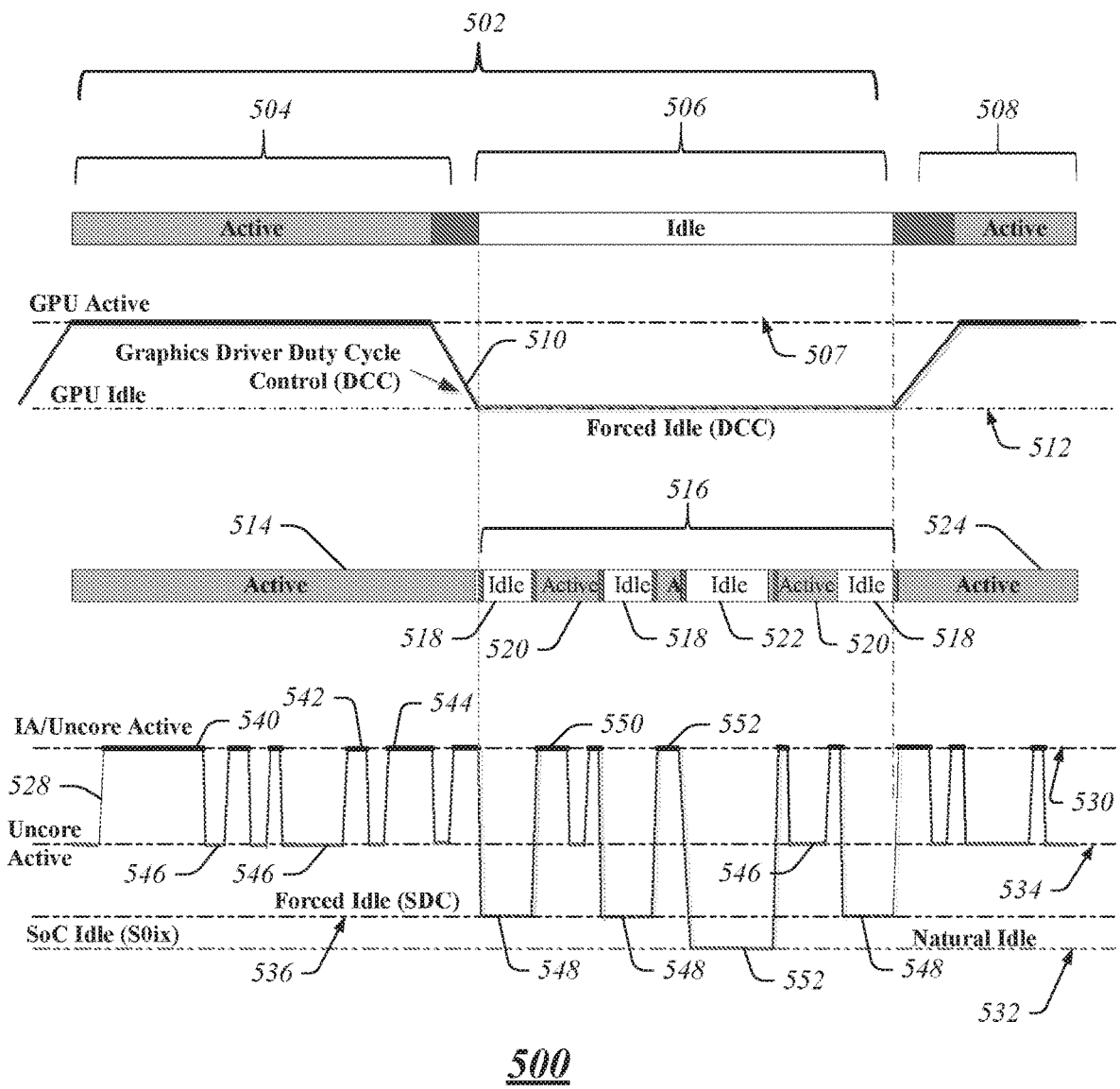
FIG. 5A. illustrates operation of a fourth embodiment of duty cycling.

FIG. 5A depicts one embodiment of "hybrid" duty cycling in which hardware duty cycling is coordinated with software duty cycling in which a graphics driver cycles a GPU between active (GPU active) and idle (GPU idle) states. Each software cycle 502 includes an active period, such as active period 504, and forced idle period, such as idle period 506. A subsequent active period 508 forms part of a new software cycle. The activity curve 510 indicates that the GPU is cycled between an active state 507 and idle state 512, which may be an RC6 state in one example. As further shown in FIG. 5, the timing of forced idle periods for hardware components including CPU core and uncore elements is scheduled to coincide with the idle state 512 set by a graphics driver. In other words, the hardware based duty cycling between active periods and forced idle periods only takes place during the graphics-driver-set idle periods in which the GPU is in an idle state. In particular, a hardware set active period 514 is aligned to coincide with the (software driven) active period 504, a hardware set duty cycling period 516 is aligned to coincide with the (software driven) idle period 506, a hardware set active period 524 is aligned to coincide with the (software driven) active period 508, and so forth.

In the scenario of FIG. 5A, the duty cycling period 516 includes active periods 520 that are interspersed with idle periods 518 and 522. As illustrated by the activity curve 528, during the hardware set active periods 514, 524, the CPU core and uncore elements may cycle between active state 530 in which the CPU core (IA) and uncore components are both active (see portions 540, 542, 544), and an intermediate state 534 in which the uncore is active but CPU core is inactive, as exemplified by portions 546. Examples of uncore elements include certain cache local to the CPU core, controllers, and other elements that may reside on a common die with the CPU core, not including the GPU. The cycling between active state 530 and intermediate state 534 may take place according to conventional procedures and generally does not involve alignment of activity of multiple platform components.

During the (software driven) idle period 506 a duty cycle control component schedules component activity during the idle periods 518 which corresponds to the forced idle portions 548 that represent a deeply power managed or idle state 536 across the entire system (platform) in which CPU core, uncore, and GPU are all in low power or idle states. The duty cycling period 516 may thus be considered a forced idle period that includes isolated sub-periods (idle periods 518, for example) in which CPU core, GPU and uncore components are all placed in idle states that define a forced idle state 548. It is to be noted that during the duty cycling period 516, operation of GPU, uncore, and CPU core components may also align to transition into a natural idle state 532 as exemplified by portion 552 that takes place in the idle period 522.

Figure 5B:
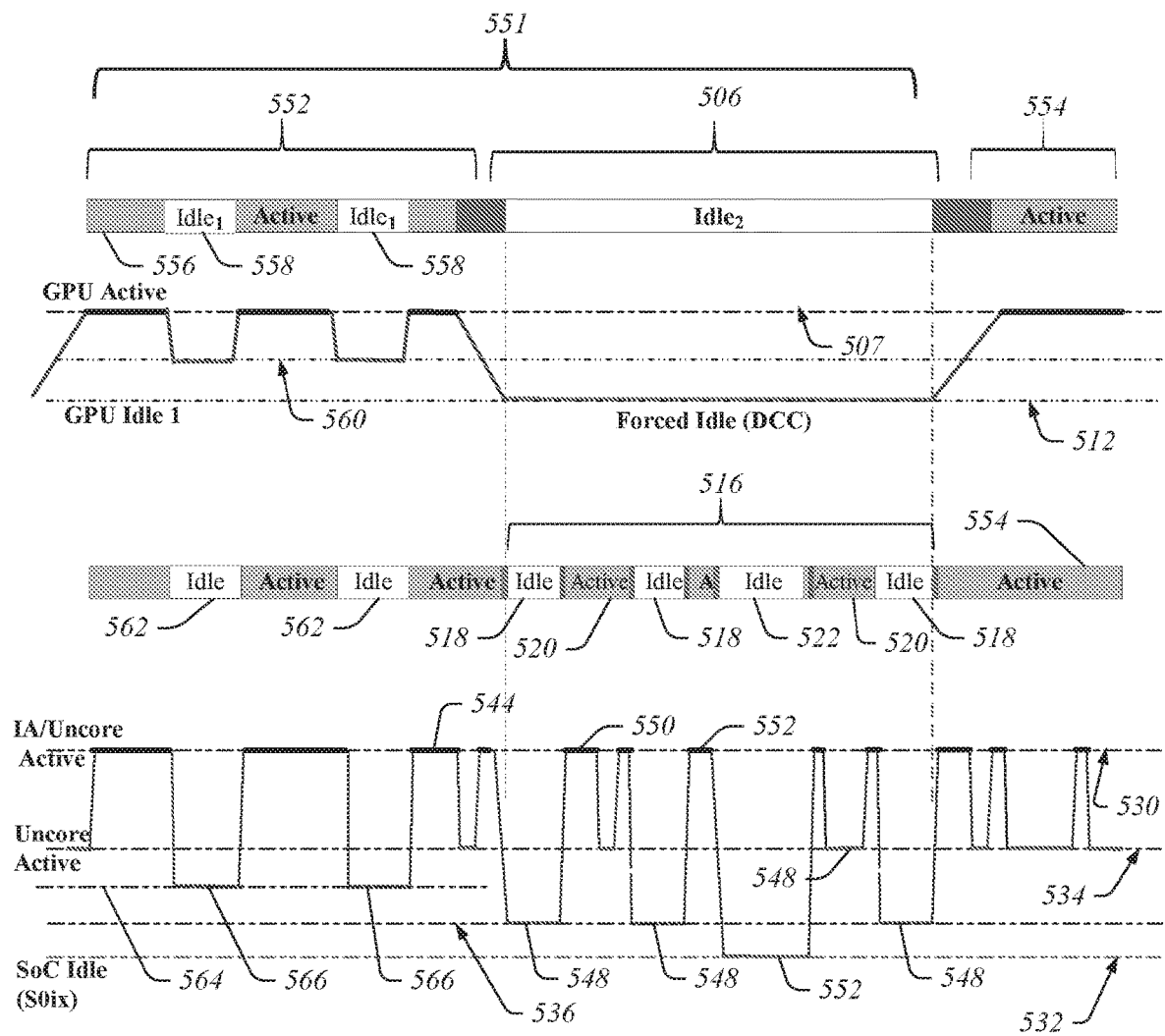
FIG. 5B illustrates operation of a fifth embodiment of duty cycling.

In other embodiments of hybrid duty cycling, a GPU component may cycle between active states and idle or intermediate states in both graphics-driver-defined active periods and idle periods. FIG. 5B depicts such an embodiment. The arrangement 550 includes a software cycle 551 that includes an active period, such as active period 552, and forced idle period, such as the aforementioned idle period 506. In this example the duty cycling is arranged such that alignment of CPU core, uncore, and GPU activity during the idle period 506 is as described with respect to FIG. 5A. Thus, between active periods 520 a series of idle (sub) periods 518 are set in which CPU core, GPU, and uncore are simultaneously placed in respective idle states that define the idle state 536.

During the active period 552, the software driver may set default operation for the GPU to correspond to the active state 507. However, the duty cycle control component coordinates duty cycling among CPU core, GPU, and other components to establish a series of forced idle periods 562 within the active period 552. As shown in FIG. 5B, the GPU thus cycles between active periods 556 and forced idle periods 558, which correspond to the platform wide forced idle sub-periods, or forced idle periods 562. The idle periods 558 are denoted as Idle$_1$ to distinguish them from idle period 506 set by the graphics driver, which may correspond to a different activity state and is labeled as Idle$_2$. As further shown in FIG. 5B, during the idle periods 558 (forced idle periods 562) the GPU is placed in an activity state 560, which is not as deep as the idle state 512. In one instance the activity state 560 may correspond to an RC3 GPU state while the idle state 512 may correspond to and RC6 GPU state. Moreover, as shown by the activity portions 566 which illustrate the platform-wide activity, the force idle periods 562 define another activity state 564, which is not as deep as the idle state 536. Accordingly, in the embodiment of FIG. 5B, although duty cycling takes place continuously in both active (556) and idle (506) GPU driver defined periods, only during the forced idle periods, such as period 506, is the GPU and thereby the platform as a whole cycled to a lowest activity state, while in the active periods the GPU and platform are cycled to shallower states during the idle sub-period.

Figure 5C:
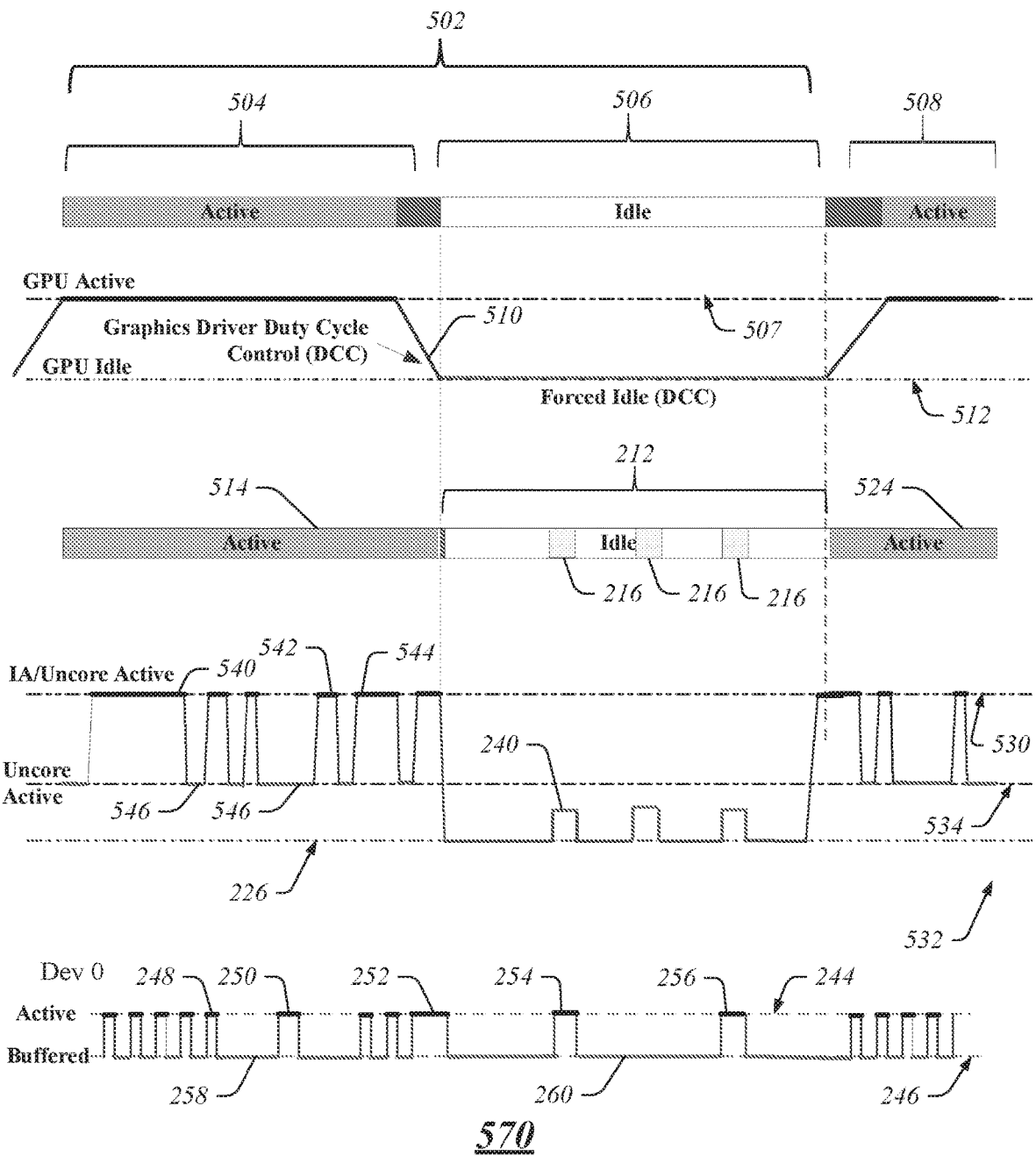
FIG. 5C illustrates operation of a sixth embodiment of duty cycling.

FIG. 5C depicts another embodiment of hybrid duty cycling in which hardware duty cycling is coordinated with software duty cycling in which a graphics driver cycles a GPU between active (GPU active) and idle (GPU idle) states. In the arrangement 570, a graphics driver acts substantially the same as in the example of FIG. 5A to generate a software cycle 502 that includes an active period 504, and idle period 506, which may repeat itself. However, during the idle period 506 the duty cycle control component performs nested duty cycling substantially the same as that illustrated in FIG. 2 for forced idle period 212. Thus, the graphics drive acts to establish the "outer" duty cycle that defines active and forced idle periods (such as idle period 506), while "inner" duty cycling that takes place within a forced idle period is set by a the duty cycle control component, which may be primarily hardware driven.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
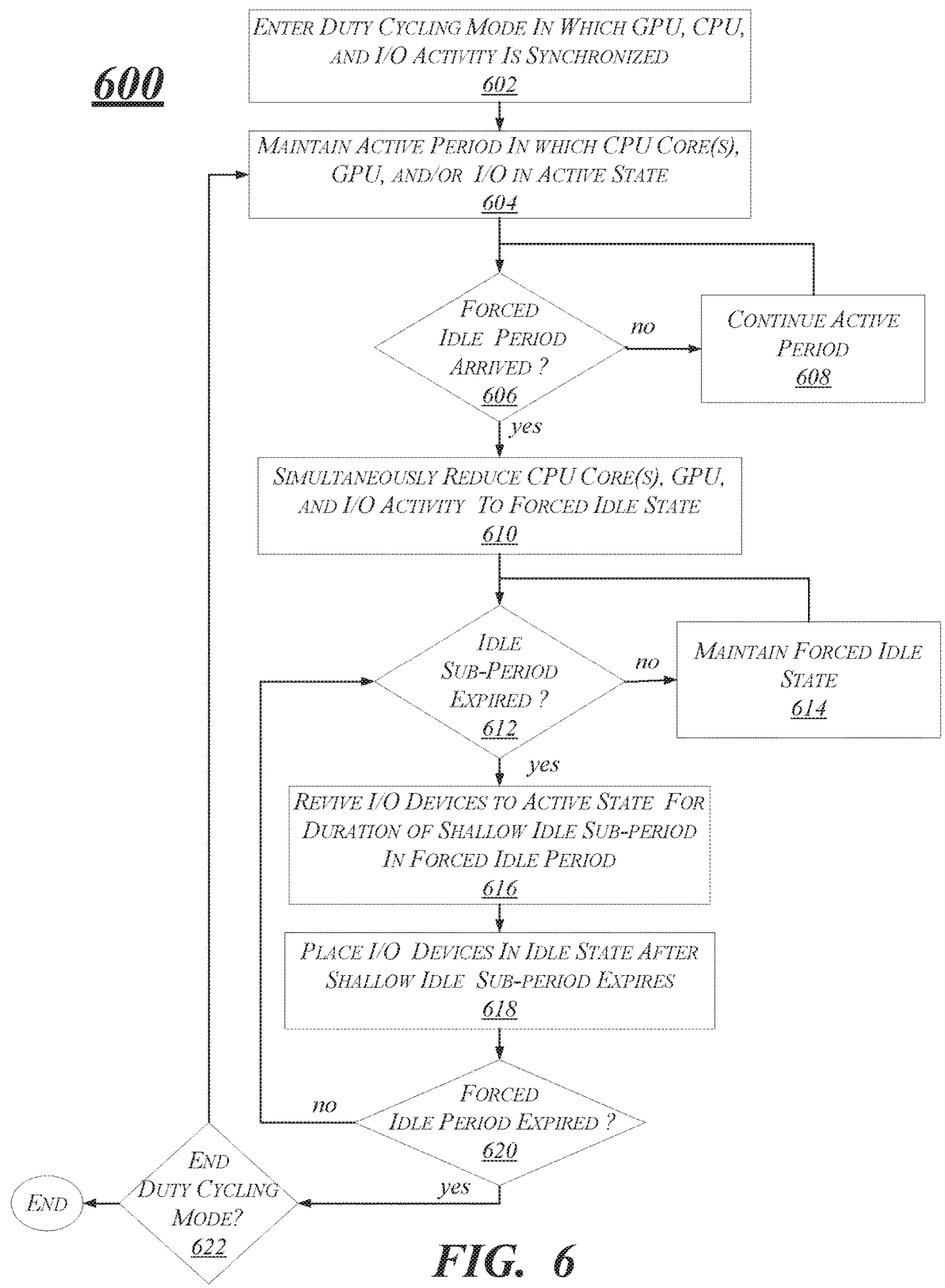
FIG. 6 presents an exemplary first logic flow.

FIG. 6 illustrates an exemplary first logic flow 600. In some implementations, the first logic flow 600. At block 602, a duty cycling mode is entered in which CPU, GPU, and I/O Activity is synchronized. In one embodiment, the duty cycling mode is set by a component of a platform that contains the CPU and GPU components, such as an SoC chip.

At block 604 an active period is entered or maintained in which platform components including CPU core components, GPU, and I/O components are maintained in active states. In some variants, one or more of the components may cycle to lower power states than the active state for at least a portion of the active period.

At block 606, a determination is made as to whether a forced idle period has arrived. In some examples the forced idle period may be set by a hardware component while in other examples, the forced idle period may be set by a software element such as a graphics driver. If not, the flow proceeds to block 608 where the active period is continued, and subsequently returns to the block 606.

If, at block 606, the forced idle period has arrived, the flow proceeds to block 610, where CPU core activity, GPU activity, and I/O activity are simultaneously reduced to a low power or idle state to define a forced idle state. In some cases, the forced idle state corresponds to a platform wide idle state such as an SoC idle state for an SoC die.

The flow then proceeds to block 612, where a determination is made as to whether an idle sub-period within the forced idle period has expired. In various embodiments the idle sub-period may be set to expire after an interval that is determined from operation of one or more I/O components. For example, the idle sub-period duration may correspond to a duration over which an I/O component of the can remain in an idle state without having to perform a DMA operation to prevent buffer overflow. If the idle-sub period has not expired, the flow then proceeds to block 614 where the forced idle state is maintained in which CPU, CPU, and I/O components are idle. The flow then returns to block 612.

If, at block 612, the idle-sub period has expired, the flow moves to block 616. At the block 616, one or more I/O devices is revived to an active state for the duration of a shallow active sub period of the forced idle period. The shallow active period duration may be set according to the requirements of the one or more I/O devices, for example, to accommodate signaling and data transfer between the one or more I/O devices and other platform components.

The flow then proceeds to block 618 in which the one or more I/O devices are placed in an idle state after the expiration of the shallow active sub-period, thereby returning the platform to a forced idle state. The flow then moves to block 620 where a determination is made as to whether the forced idle period has expired. If not, the flow returns to block 612. If so the flow proceeds to block 622 where a decision is made as to whether duty cycling mode is to end. If not, the flow returns to block 604 where the active state resumes. If so, the flow ends.

Figure 7:
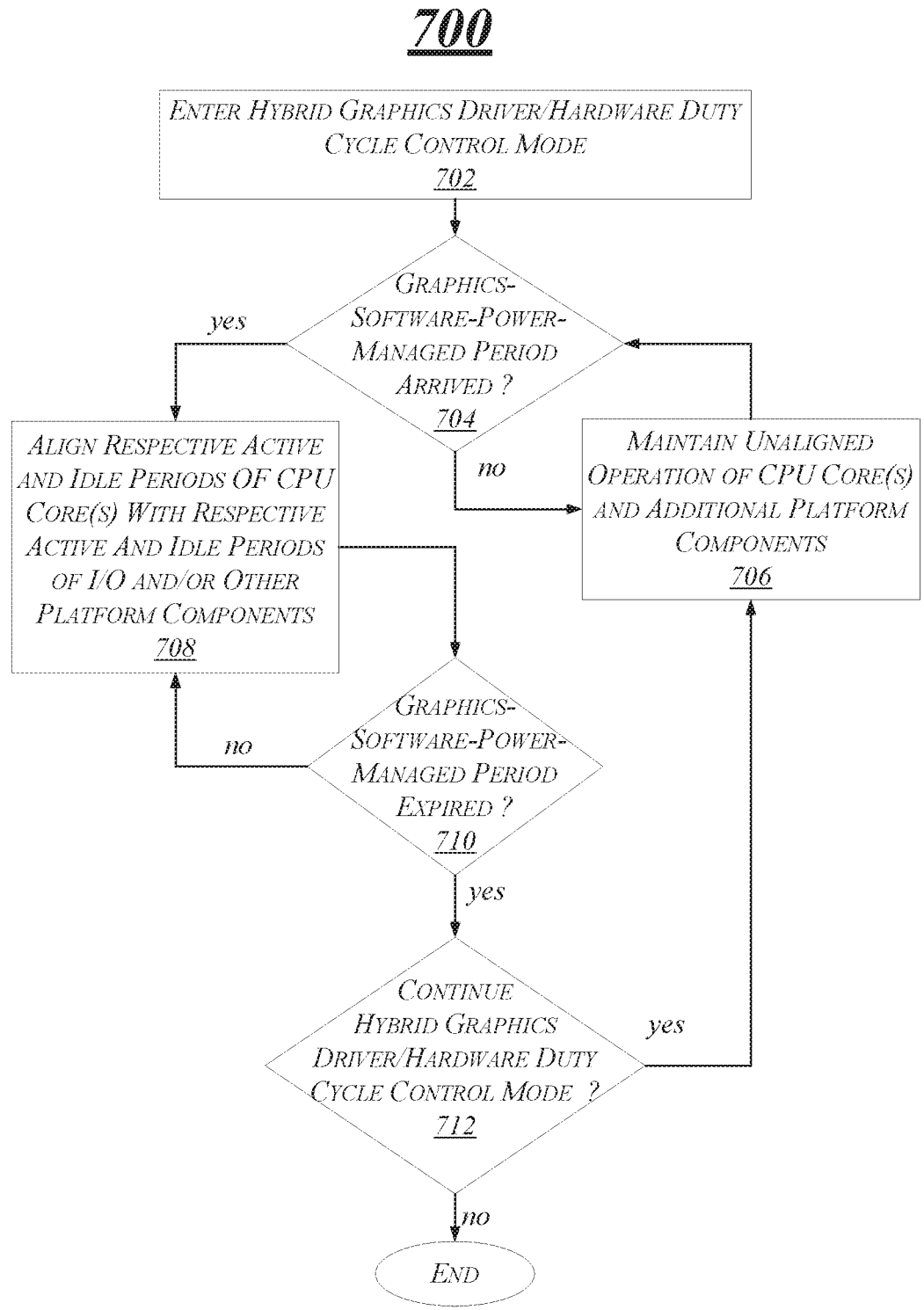
FIG. 7 presents an exemplary second logic flow.

FIG. 7 illustrates an exemplary second logic flow 700. At block 702 a hybrid graphics driver/hardware duty cycle control mode is entered or initiated. At block 704 a determination is made as to whether a graphics-software-power-managed period has arrived. The graphics-software-power-managed period may define a period in which a drives sets the activity of a GPU to a low power state such as an idle state. If not, the flow proceeds to block 706 where unaligned operation of CPU core and additional platform elements take place. The CPU core and/or additional platform elements, may, for example, transition between different activity (power) states independently of one another. If the graphics-software-power-managed period has arrived, the flow proceeds to block 708 where respective active and idle periods of a CPU core and I/O and/or other platform components are aligned.

The flow then proceeds to block 710 where a determination is made as to whether the graphics-software-powermanaged period has expired. If not, the flow returns to block 708. If so, the flow moves to block 712 where a decision is made as to continue the graphics driver/hardware duty cycle control mode. If so, the flow returns to block 706. If not, the flow ends.

Figure 8:
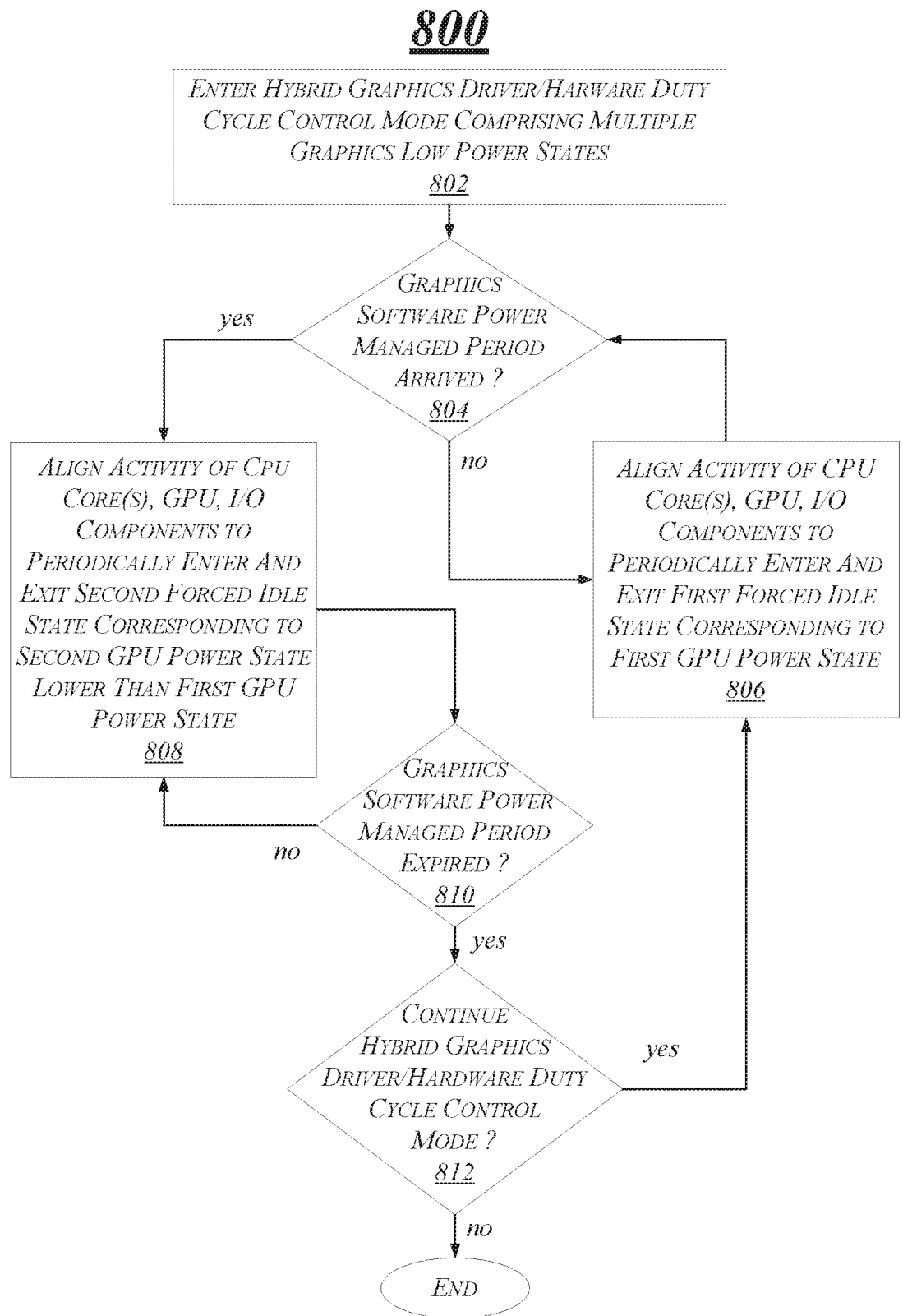
FIG. 8 presents an exemplary third logic flow.

FIG. 8 depicts an exemplary third logic flow 800. At block 802, a hybrid graphics driver/hardware duty cycle control code is entered that contains multiple graphics low power states. At block 804 a determination is made as to whether a graphics software power managed period has arrived. If not, the flow proceeds to block 806.

At block 806, the activity of CPU core, GPU, and I/O components are aligned to periodically enter and exit a first forced idle state corresponding to a first GPU power state. For example, the first forced idle state may place the CPU core and I/O components in an idle state while placing the GPU in a power managed state such as an RC3 state. The flow then returns to block 804.

If at block 804, the graphics software power managed period has arrived, the flow proceeds to block 808. At the block 808, the activity of CPU core, GPU, and I/O components are aligned to periodically enter and exit a second forced idle state corresponding to a second GPU power state that is lower than the first GPU power state. For example, the second forced idle state may place the CPU core and I/O components in an idle state while placing the GPU in an idle or RC6 state. The flow then proceeds to block 810.

At block 810 a decision is made as to whether the software power managed period has expired. If not, the flow returns to block 808. If so, the flow moves to block 812.

At block 812 a determination is made as to whether to continue the hybrid graphics driver/hardware duty cycle control mode. If so, the flow returns to block 806. If not the flow ends.

Figure 9:
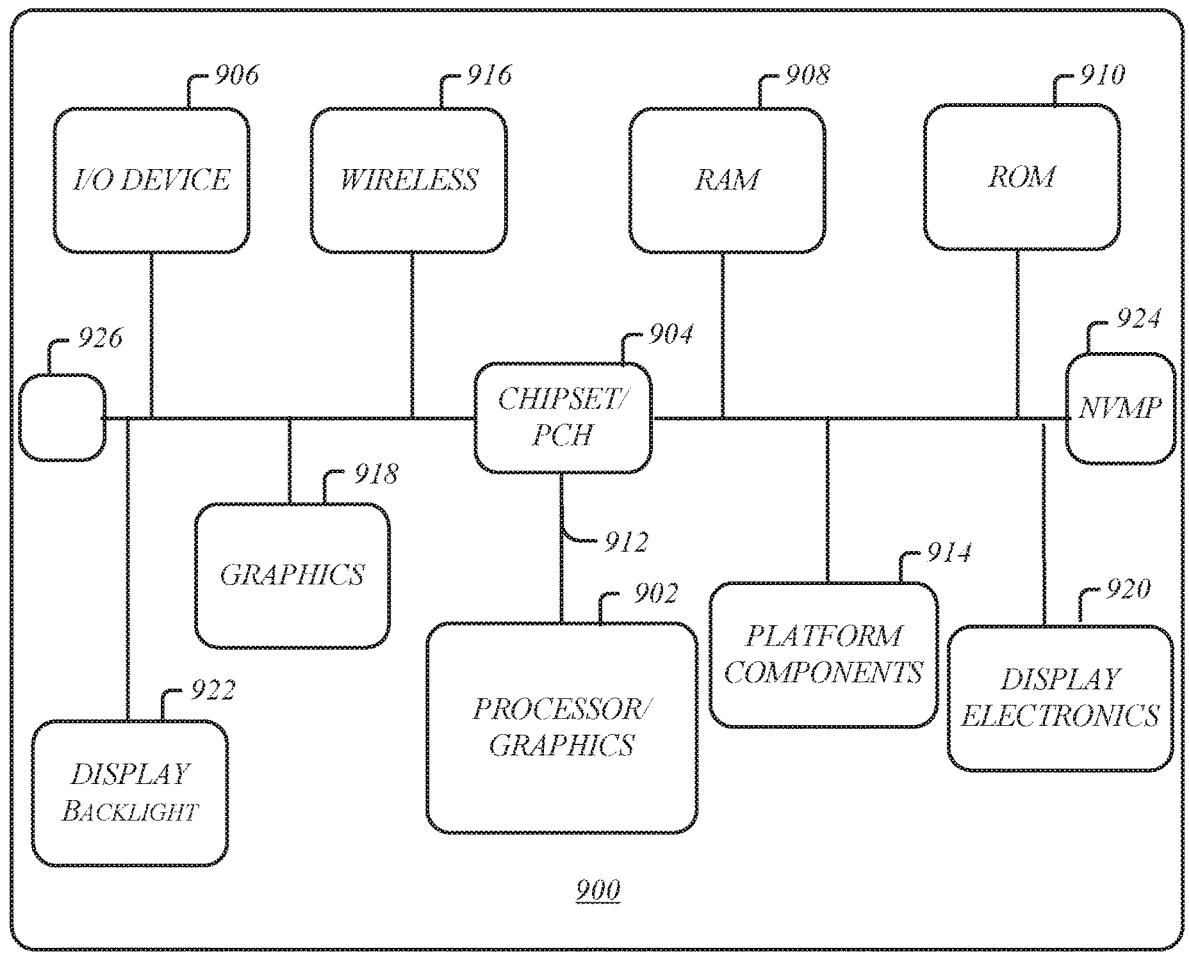
FIG. 9 is a diagram of an exemplary system embodiment.

FIG. 9 is a diagram of an exemplary system embodiment and in particular, FIG. 9 is a diagram showing a platform 900, which may include various elements. For instance, FIG. 9 shows that platform (system) 900 may include a processor/graphics core 902, a chipset/platform control hub (PCH) 904, an input/output (I/O) device 906, a random access memory (RAM) (such as dynamic RAM (DRAM)) 908, and a read only memory (ROM) 910, display electronics 920, display backlight 922, and various other platform components 914 (e.g., a fan, a crossflow blower, a heat sink, DTM system, cooling system, housing, vents, and so forth). System 900 may also include wireless communications chip 916 and graphics device 918. The embodiments, however, are not limited to these elements.

As shown in FIG. 9, I/O device 906, RAM 908, and ROM 910 are coupled to processor 902 by way of chipset 904. Chipset 904 may be coupled to processor 902 by a bus 912. Accordingly, bus 912 may include multiple lines.

Processor 902 may be a central processing unit comprising one or more processor cores and may include any number of processors having any number of processor cores. The processor 902 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 902 may be multiple separate processors located on separate integrated circuit chips. In some embodiments processor 902 may be a processor having integrated graphics, while in other embodiments processor 902 may be a graphics core or cores.

The following examples pertain to further embodiments.

Example 1 is an apparatus for power management, comprising: a multiplicity of processor components; one or more device components communicatively coupled to one or more processor components of the multiplicity of processor components; and a controller comprising logic at least a portion of which is in hardware, the logic to schedule one or more forced idle periods interspersed with one or more active periods, a forced idle period spanning a duration during which one or more of the multiplicity of processor components and the one or more device components are simultaneously placed in respective idle states that define a forced idle power state during isolated sub-periods of the forced idle period.

In example 2, the multiplicity of processor components of example 1 may optionally include one or more general processor cores and graphics processing units, and the one or more device components comprising one or more respective input/output devices.

In example 3, the controller of any of examples 1-2 may optionally schedule during the one or more forced idle periods one or more shallow active periods comprising a power state that is intermediate between the forced idle power state and an active power state during which at least one of the one or more device components are active.

In example 4, the one or more shallow active periods of any of claims 1-3 may optionally comprising multiple shallow active periods that are spaced by an interval determined by a buffer capacity of at least one of the one or more device components.

In example 5, the controller of any of examples 1-4 may optionally set a multiplicity of nesting levels for cycling between shallow active periods within a forced idle period, a nesting level having a nesting period different from that of another nesting level.

In example 6, the one or more shallow active periods of any of examples 1-5 may optionally comprise periods in which one or more of the one or more device components is active and a path to memory is active for an active device of the one or more device components.

In example 7, the controller of any of examples 1-6 may optionally align activity of two or more of the multiplicity of processor components to define the one or more active periods, an active period comprising an active power state in which two or more of the multiplicity of processor components are simultaneously active for at least a portion of the active period.

In example 8, the multiplicity of processor components of any of examples 1-7 may comprise a graphics processor unit, the duty cycle control component to align one or more forced idle periods to coincide with at least one graphics idle period defined by a graphics driver for the graphics processor unit.

In example 9, the controller of any of examples 1-8 may optionally comprise a power management unit communicatively coupled to the graphics driver to exchange information to align one or more of the forced idle periods and one or more of the at least one graphics idle periods.

In example 10, the controller of any of claims 1-9 may optionally generate one or more forced idle sub-periods within a forced idle period of the one or more forced idle periods, a forced idle period corresponding to a period in which processor cores, graphics processor unit, and one or more device components are inactive.

In example 11, the controller of any of examples 1-10 may optionally schedule one or more deep forced idle sub-periods within one or more graphics idle periods and one or more shallow forced idle sub-periods within an active period, a deep graphics power state in the one or more deep forced idle periods being lower than a shallow graphics power state in the one or more shallow forced idle periods.

In example 12 at least one of the one or more processor components and at least one of the one or more device components of the apparatus of any of the examples 1-11 are located on a system-on-a-chip comprising a single semiconductor die.

In example 13, at least one computer-readable storage medium comprises instructions that, when executed, cause a controller to: schedule one or more forced idle periods interspersed with one or more active periods for a platform; and simultaneously place a multiplicity of processor components of the platform into an idle state and place one or more device components of the platform into respective idle states during isolated sub-periods of the forced idle period.

In example 14, the at least one computer-readable storage medium of example 13 optionally includes instructions that, when executed, cause a controller to schedule during the one or more forced idle periods one or more shallow active periods comprising a power state that is intermediate between the forced idle power state and the active power state during which at least one of the one or more device components are active.

In example 15, the at least one computer-readable storage medium of any of examples 13-14 optionally includes instructions that, when executed, cause a controller to schedule multiple shallow active periods that are spaced by an interval determined by a buffer capacity of at least one of the one or more device components.

In example 16, the at least one computer-readable storage medium of any of examples 13-15 optionally includes instructions that, when executed, cause a controller to set a multiplicity of nesting levels for cycling between shallow active periods within a forced idle period, a nesting level having a nesting period different from that of another nesting level.

In example 17, the at least one computer-readable storage medium of any of examples 13-16 optionally includes instructions that, when executed, cause a controller to maintain a path to memory active for the one or more device components during the one or more shallow active periods.

In example 18, the at least one computer-readable storage medium of any of examples 13-17 optionally instructions that, when executed, cause a controller to align activity of two or more processor components of the multiplicity of processor components to define the one or more active periods, an active period comprising an active power state in which two or more processor components of the multiplicity of processor components are simultaneously active for at least a portion of the active period.

In example 19, the at least one computer-readable storage medium of any of examples 13-18 optionally instructions that, when executed, cause a controller to align one or more forced idle periods to coincide with at least one graphics idle period defined by a graphics driver.

In example 20, the at least one computer-readable storage medium of any of examples 13-19 optionally instructions that, when executed, cause a controller to generate one or more forced idle sub-periods within a forced idle period of the one or more forced idle periods, the forced idle period corresponding to a period in which processor cores, graphics processor unit, and one or more device components are inactive.

In example 21, the at least one computer-readable storage medium of any of examples 13-20 optionally instructions that, when executed, cause a controller to schedule one or more deep forced idle sub-periods within one or more graphics idle periods and one or more shallow forced idle sub-periods within an active period, a deep graphics power state in the one or more deep forced idle periods being lower than a shallow graphics power state in the one or more shallow forced idle periods.

In example 22, an apparatus for power management includes a multiplicity of processor components; one or more device components communicatively coupled to one or more processor components of the multiplicity of processor components; and a processor comprising logic at least a portion of which is in hardware, the logic to schedule one or more forced idle periods interspersed with one or more active periods, a forced idle period spanning a duration during which one or more of the multiplicity of processor components and one or more of the one or more device components are simultaneously placed in respective idle states that define a forced idle power state during isolated sub-periods of the forced idle period.

In example 23, the multiplicity of processor components of example 22 optionally includes one or more general processor cores and graphics processing units, and the one or more device components comprising one or more input/output devices.

In example 24, the processor of any one of examples 22-23 optionally schedules during the one or more forced idle periods one or more shallow active periods comprising a power state that is intermediate between the forced idle power state and an active power state during which at least one of the one or more device components are active.

In example 25, the one or more shallow active periods of any of examples 22-24 optionally include multiple shallow active periods that are spaced by an interval determined by a buffer capacity of at least one of the one or more device components.

In example 26, the processor of any one of examples 22-25 optionally sets a multiplicity of nesting levels for cycling between shallow active periods within a forced idle period, a nesting level having a nesting period different from that of another nesting level.

In example 27, the one or more shallow active periods of any of examples 22-26 optionally comprise periods in which one or more of the one or more device components is active and a path to memory is active for an active device of the one or more device components.

In example 28, the processor of any one of examples 22-27 optionally aligns activity of two or more of the multiplicity of processor components to define the one or more active periods, an active period comprising an active power state in which two or more of the multiplicity of processor components are simultaneously active for at least a portion of the active period.

In example 29, the multiplicity of processor components of any of examples 22-28 optionally includes a graphics processor unit, the processor optionally aligns one or more forced idle periods to coincide with at least one graphics idle period defined by a graphics driver for the graphics processor unit.

In example 30, the processor of any of examples 22-29 optionally comprises a power management unit communicatively coupled to the graphics driver to exchange information to align one or more of the forced idle periods and one or more of the at least one graphics idle periods.

In example 31, the processor of any one of examples 22-30 optionally generates one or more forced idle sub-periods within a forced idle period of the one or more forced idle periods, the forced idle period corresponding to a period in which processor cores, graphics processor unit, and one or more device components are inactive.

In example 32, the processor of any one of examples 22-31 optionally schedules one or more deep forced idle sub-periods within one or more graphics idle periods and one or more shallow forced idle sub-periods within an active period, a deep graphics power state in the one or more deep forced idle periods being lower than a shallow graphics power state in the one or more shallow forced idle periods.

In example 33 at least one of the one or more processor components and at least one of the one or more device components of the apparatus of any of the examples 22-32 are located on a system-on-a-chip comprising a single semiconductor die.

In example 34, at least one computer-readable storage medium includes instructions that, when executed, cause a processor to: schedule one or more forced idle periods interspersed with one or more active periods for a platform; and simultaneously place one or more of a multiplicity of processor components of the platform into an idle state and place one or more device components of the platform into respective idle states during isolated sub-periods of the forced idle period.

In example 35, the at least one computer-readable storage medium of example 34 optionally comprises instructions that, when executed, cause a processor to schedule during the one or more forced idle periods one or more shallow active periods comprising a power state that is intermediate between the forced idle power state and an active power state during which at least one of the one or more device components are active.

In example 36, the at least one computer-readable storage medium of any of examples 34-35 optionally comprises instructions instructions that, when executed, cause a processor to schedule multiple shallow active periods that are spaced by an interval determined by a buffer capacity of at least one of the one or more device components.

In example 37, the at least one computer-readable storage medium of any of examples 34-36 optionally comprises instructions that, when executed, cause a processor to set a multiplicity of nesting levels for cycling between shallow active periods within a forced idle period, a nesting level having a nesting period different from that of another nesting level.

In example 38, the at least one computer-readable storage medium of any of examples 34-37 optionally comprises instructions that, when executed, cause a processor to maintain a path to memory active for the one or more device components during the one or more shallow active periods.

In example 39, the at least one computer-readable storage medium of any of examples 34-38 optionally comprises instructions that, when executed, cause a processor to align activity of two or more of the multiplicity of processor components to define the one or more active periods, an active period comprising an active power state in which two or more of the multiplicity of processor components are simultaneously active for at least a portion of the active period.

In example 40, the at least one computer-readable storage medium of any of examples 34-39 optionally cause a processor to align one or more forced idle periods to coincide with at least one graphics idle period defined by a graphics driver.

In example 41, the at least one computer-readable storage medium of any of examples 34-40 optionally comprises instructions that, when executed, cause a processor to generate one or more forced idle sub-periods within a forced idle period of the one or more forced idle periods, the forced idle period corresponding to a period in which processor cores, graphics processor unit, and one or more device components are inactive.

In example 42, the at least one computer-readable storage medium of any of examples 34-41 optionally comprises instructions that, when executed, cause a processor to schedule one or more deep forced idle sub-periods within one or more graphics idle periods and one or more shallow forced idle sub-periods within an active period, a deep graphics power state in the one or more deep forced idle periods being lower than a shallow graphics power state in the one or more shallow forced idle periods.

In example 43, a system for power management, comprises a multiplicity of processor components; one or more device components communicatively coupled to one or more processor components of the multiplicity of processor components; and a controller and processor coupled to the multiplicity of processor components, the controller and/or processor comprising logic at least a portion of which is in hardware, the logic to schedule one or more forced idle periods interspersed with one or more active periods, a forced idle period spanning a duration during which one or more of the multiplicity of processor components and at least one of the one or more device components are simultaneously placed in respective idle states that define a forced idle power state during isolated sub-periods of the forced idle period.

In example 44, the multiplicity of processor components of example 43 optionally includes one or more general processor cores and graphics processing units, and the one or more device components comprises one or more input/output devices.

In example 45, the logic of any of examples 43-44 optionally may schedule during the one or more forced idle periods one or more shallow active periods comprising a power state that is intermediate between the forced idle power state and an active power state during which at least one of the one or more device components are active.

In example 46, the one or more shallow active periods of examples 43-45 optionally may include multiple shallow active periods that are spaced by an interval determined by a buffer capacity of at least one of the one or more device components.

In example 47, the logic of any of examples 43-46 may optionally set a multiplicity of nesting levels for cycling between shallow active periods within a forced idle period, a nesting level having a nesting period different from that of another nesting level.

In example 48, the one or more shallow active periods of any of examples 43-47 optionally includes periods in which one or more of the one or more device components is active and a path to memory is active for an active device of the one or more device components.

In example 49, the logic of any of examples 43-48 optionally may align activity of two or more of the multiplicity of processor components to define the one or more active periods, an active period comprising an active power state in which two or more of the multiplicity of processor components are simultaneously active for at least a portion of the active period.

In example 50, the multiplicity of processor components of any of examples 43-49 optionally includes a graphics processor unit, the logic to align one or more forced idle periods to coincide with at least one graphics idle period defined by a graphics driver for the graphics processor unit.

In example 51, the logic of any of examples 43-50 optionally comprises a power management unit communicatively coupled to the graphics driver to exchange information to align one or more of the forced idle periods and at least one graphics idle periods.

In example 52, the logic of any of examples 43-51 optionally generates one or more forced idle periods within a forced idle sub-period of the one or more forced idle periods, the forced idle period corresponding to a period in which processor cores, graphics processor unit, and one or more device components are inactive.

In example 53, the logic of any of examples 43-52 may optionally schedule one or more deep forced idle sub-periods within one or more graphics idle periods and one or more shallow forced idle sub-periods within an active period, a deep graphics power state in the one or more deep forced idle periods being lower than a shallow graphics power state in the one or more shallow forced idle periods.

In example 54 at least one of the one or more processor components and at least one of the one or more device components of the system of any of examples 43-53 are located on a system-on-a-chip comprising a single semiconductor die.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a computer-readable medium or article which may store an instruction or a set of instructions that, if executed by a computer, may cause the computer to perform a method and/or operations in accordance with the embodiments. Such a computer may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating,"

"determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
    a processor; and
    a memory comprising instructions that when executed by the processor cause the processor to:
        identify arrival of a graphics-software-power managed period;
        align an active period of a central processing unit (CPU) core with an active period of an input/output (I/O) component; and
        align an idle period of the CPU core with an idle period of the I/O component.

2. The apparatus of claim 1, wherein the active and idle periods of the CPU core are driven by an operating system (OS) and the active and idle periods of the I/O component are driven by hardware.

3. The apparatus of claim 1, the memory comprising instructions that when executed by the processor cause the processor to align the active period of the CPU core with an active period of a platform component.

4. The apparatus of claim 3, the memory comprising instructions that when executed by the processor cause the processor to align the idle period of the CPU core with the active period of the platform component.

5. The apparatus of claim 4, wherein the platform component comprises one or more of a cache, the memory, and a graphic processing unit.

6. The apparatus of claim 4, wherein the platform component comprises a graphics processing unit (GPU).

7. The apparatus of claim 6, wherein the active and idle periods of the CPU core are driven by an operating system (OS), the active and idle periods of the I/O component are driven by hardware, and the active and idle periods of the GPU are driver based.

8. The apparatus of claim 1, wherein the idle periods of the CPU core and the I/O component include an idle sub-period and a shallow active sub-period.

9. The apparatus of claim 8, the memory comprising instructions that when executed by the processor cause the processor to determine a duration of the idle sub-period based on an amount of time the I/O component can remain in an idle state without having to perform a direct memory access (DMA) operation to prevent buffer overflow.

10. At least one non-transitory computer-readable medium comprising a set of instructions that, in response to being executed by a processor circuit, cause the processor circuit to:
    identify arrival of a graphics-software-power managed period;
    align an active period of a central processing unit (CPU) core with an active period of an input/output (I/O) component; and
    align an idle period of the CPU core with an idle period of the I/O component.

11. The at least one non-transitory computer-readable medium of claim 10, comprising instructions that, in response to being executed by the processor circuit, cause the processor circuit to align the active period of the CPU core with an active period of a platform component.

12. The at least one non-transitory computer-readable medium of claim 11, comprising instructions that, in response to being executed by the processor circuit, cause the processor circuit to align the idle period of the CPU core with the active period of the platform component.

13. The at least one non-transitory computer-readable medium of claim 11, wherein the platform component comprises a graphics processing unit (GPU).

14. The at least one non-transitory computer-readable medium of claim 13, wherein the active and idle periods of the CPU core are driven by an operating system (OS), the active and idle periods of the I/O component are driven by hardware, and the active and idle periods of the GPU are driver based.

15. The at least one non-transitory computer-readable medium of claim 10, wherein the idle periods of the CPU core and the I/O component include an idle sub-period and a shallow active sub-period.

16. The at least one non-transitory computer-readable medium of claim 15, comprising instructions that, in response to being executed by the processor circuit, cause the processor circuit to determine a duration of the idle sub-period based on an amount of time the I/O component can remain in an idle state without having to perform a direct memory access (DMA) operation to prevent buffer overflow.

17. A computer-implemented method, comprising:
    identifying arrival of a graphics-software-power managed period;
    aligning an active period of a central processing unit (CPU) core with an active period of an input/output (I/O) component; and
    aligning an idle period of the CPU core with an idle period of the I/O component.

18. The computer-implemented method of claim 17, comprising aligning the active period of the CPU core with an active period of a platform component.

19. The computer-implemented method of claim 18, comprising aligning the idle period of the CPU core with the active period of the platform component.

20. The computer-implemented method of claim 19, wherein the platform component comprises a graphics processing unit (GPU) and the active and idle periods of the CPU core are driven by an operating system (OS), the active and idle periods of the I/O component are driven by hardware, and the active and idle periods of the GPU are driver based.

* * * * *